3,247,133
METHOD OF FORMING GRAFT COPOLYMER ION EXCHANGE MEMBRANES
William Kwo-wei Chen, Stamford, Conn., assignor to American Machine & Foundry Company, a corporation of New Jersey
No Drawing. Continuation of application Ser. No. 591,787, June 18, 1956. This application Nov. 2, 1962, Ser. No. 235,529
14 Claims. (Cl. 260—2.1)

This application is a continuation of Ser. No. 591,787, filed June 18, 1956, and now abandoned.

This invention relates to organic polymeric ion exchange membranes and to methods of making and using them. More particularly, a specific embodiment of this invention relates to ion exchange membranes made from copolymers which have been made with "high energy ionizing" radiation.

Ion exchange materials generally require not only chemical stability and high exchange capacity but also a variety of mechanical properties such as toughness, flexibility, elasticity and freedom from internal stress and strain. The mechanical properties are particularly important for ion exchange material in the form of membranes but are also significant when the materials are used in bead form.

Ion exchange materials with good chemical properties alone have been well developed. For many applications and particularly for membranes, materials which combine both the desirable chemical and desirable mechanical properties, such as freedom from internal stress which leads to cracking after much recycling, have not yet been described. Generally improved mechanical properties lead to a longer operating life of these materials.

Therefore, it is an object of this invention to provide ion exchange membranes which have both high chemical efficiency and high mechanical durability.

It is also an object of this invention to provide methods of making ion exchange material characterized by both high chemical efficiency and mechanical durability.

The ion exchange material of the invention, and in particular the membrane form, has both improved chemical efficiency and mechanical properties. This is achieved by the chemical combination of selected materials which have the desired chemical properties with structural organizing and supporting material. This combination is so firm and intimate that the components are for practical purposes a single inseparable entity. Therefore, the component embodying the chemical properties is not leached away from the skeletal structural material. Moreover, the physical properties of the novel complex ion exchange material of this invention are substantially those of the inert component selected as the structural organizer and are almost directly proportional to the relative amount of inert component in the novel ion exchange complex.

The term "high energy ionizing" radiation includes ultraviolet and X-rays as well as pile radiation and alpha, beta and gamma rays. When applied to some polymers and particularly to vinyl polymers and to both natural and synthetic rubber as well as polyamides, polyesters and thermosetting resins, this radiation forms free radical sites which initiate additional polymerization of monomer in contact with the polymer by virtue of an affinity for selected monomers which in turn provide sites for the attachment of ion exchange groups.

The ion exchange materials of this invention are in the solid phase at room temperature and pressure. They may be used as sheets or tubes or other molded or cast shapes, or may be used as beads or pellets. When in the form of membranes, they find use as the elements of multiple chamber dialysis cells and in the more finely divided from they are easily used in standard ion exchange columns. They are suitable for all well known ion exchange purposes such as demineralization of water, collection or concentration of radio-active material or heavy metals and the purification of protein and sugar solutions. Ion exchange membranes made according to this invention can be stored or transported in a dry state, and this is an important commerical advantage.

The invention embodies a chemically "inert" organic polymer which lends desirable mechanical properties to the ion exchange material, in chemical combination with an "active" organic appendage which includes an ion exchange group. "Inert" is here used in the sense of being unreactive to free ions and substantially water insoluble, whereas "active" material forms a polyelectrolyte. The inert polymer is the organizing element of the ion exchange material and functions somewhat as a trunk functions in a tree, in that it serves as a common link for other structural elements. The active material is attached to the inert material in a branched form. Some of the branches are not only interlaced but are connected with one another by chemical bonds and are connected to the trunk at more than one place and even to more than one fiber or polymer chain of the trunk and so function as a cross linkage. The branches furnish sites for ion exchange groups which are formed in a chemical manner unless ion exchange groups are already a part of the branch structure.

The stability of the entire structure is or can be enhanced by cross linkages both among the inert polymeric elements of the trunk and among the branch groups. The method of augmenting this cross linking which limits swelling is a feature of the invention and includes treatment with high energy ionizing radiation.

The inert trunk polymer, which may be internally cross linked, is preferably a vinyl polymer or copolymer. Various combinations of inert polymers and polymeric precursors may be copolymerized, and the invention includes these either singly or in combination. Polyethylene of densities between about 0.91 and 0.95 is a preferred trunk material. Polyvinyl halides such as polyvinyl chloride, polyvinylbromide, polyvinyl fluoride and polyvinyl iodide are likewise useful. Polyvinylidiene halides such as polyvinylidiene chloride, polyvinylidiene bromide, polyvinlidiene fluoride and polyvinylidene iodide may be used. Polymers of acrylonitrile, propylene (amorphous or isotactic), butadine, vinyl ethers (amorphous or isotactic and thermosetting resins such as urea and phenolic resins also will work well. Alkylacrylates and alkyl methacrylates, such as methyl or ethyl methacrylates, as well as both natural and synthetic rubbers are useful.

The active polymer branches which furnish sites for the location of ion exchange groups are formed by grafting monomeric material onto the inert trunk polymer by treatment with ionizing radiation such as styrene, which is a preferred branch material, and styrene derivatives such as alpha alkyl styrenes (e.g., alpha methyl styrene), alpha halogenated styrenes (e.g., alpha chlorostyrene or alpha bromostyrene), haloalkyl styrenes (e.g., chloromethyl styrene or bromoethyl styrene) or esters of styrene sulfonic acid. Other vinyl monomers also furnish very satisfactory branch material. Among the latter are: vinyl pyridine, vinyl piperidine, vinyl lutidine, vinyl carbazole, vinyl sulfones, vinyl naphthalene and vinyl aniline. Acrylic acid, methacrylic acid and allyl amine also are useful. N,N-dialkylamino ethyl methacrylates can also be used. Some of these are: N,N-dimethylaminoethyl acrylate or methacrylate and N,N-diethylaminoethyl acrylate or methacrylate.

The active polymer branches are treated by chemical methods to produce ion exchange groups thereupon. For example cation exchange material can be produced by sulfonation of the phenyl groups in the branch chains. This procedure is easily performed by treatment with chlorosulfonic acid, oleum, concentrated sulfuric acid or sulfame. Amination by a tertiary amine after chloromethylation of the phenyl groups produces very satisfactory quaternary amine anion exchange material. Some of the active polymer branch material is inherently ionizable and requires no further treatment. Among the branch materials which require no further treatment to form ion exchange groups are vinyl pyridine, vinyl piperidine, vinyl lutidine, vinyl aniline, allyl amine and N,N-dialklaminoethyl methacrylates.

According to the method of this invention solid polymeric material is contacted with suitable active monomer which is in the liquid phase. The monomeric material may be either pure or dissolved in a non-reacting liquid. The monomeric material is absorbed by the polymeric material and a swelling occurs. It is a feature of this invention that graft polymerization is easily induced even in the presence of a polymerization inhibitor.

If the polymer is irradiated before contact with the liquid, it is not only partially cross linked but free radical sites are formed where the monomer attaches immediately upon contact. The degree of cross linking of the polymer prior to contact with the monomer to some degree controls the amount or absorption and swelling both in contact with monomer and in subsequent ion exchange use. The swelling may be further controlled by including up to about 20% divinyl or trivinyl monomers or other similar cross linking materials together with vinyl monomer. Among these are divinyl benzene, ethylene glycol dimethacrylate, diallyl carbonate, diallyl phthalate and triallyl cyanureate. When many ions exchange groups are incorporated within an ion exchange membrane, the degree of swelling in ion exchange applications as distinguished from swelling during the absorption of monomer, increases and wet capacity, after reaching a maximum value, declines. It is, therefore, desirable to control the swelling.

The graft copolymers used to produce ion exchange material according to this invention are believed to be branched rather than linear. The inert linear component develops free radical sites along its length under the influence of radiation. It is at these sites that monomeric material attaches. Monomer may also be attached to more than one inert polymer unit, but this bridging or cross linking effect is of a local character. Moreover monomeric material is generally itself polymerized to form polymeric chain branches.

In general the method of this invention includes contacting solid polymeric material with monomeric material in a liquid phase. Free radical sites are formed in the solid material by ionizing radiation either before or during contact with monomer. When the two materials are contacted, absorption and swelling occur in the solid phase which increases in weight relative to the amount of monomer taken up.

The swollen solid mass is next removed from contact with monomer and excess monomer is removed as by washing with a volatile solvent such as benzene or toluene. Radiation can be used to form the copolymer at any process stage prior to the removal of excess monomer. Radiation treatment subsequent to the removal operation serves to cross link the polymer chains further in ion exchange applications and so form a more insoluble material with less swelling or fluid absorption.

Finally ion exchange groups are provided by chemical methods on appropriate sites in the active branches. These groups may, however, be inherent in the active material selected when this material is structurally a polyelectrolyte and will then require no additional treatment.

The invention is further described and illustrated by the following detailed examples:

Example 1

In a preferred example of a method according to this invention a polyethylene film four mils thick and three inches square was immersed in styrene monomer for about thirty minutes. Absorption or swelling reached an equilibrium maximum within this time and the whole system was next irradiated by exposure for five hours to a cobalt sixty source. The total radiation dose was about $1.5 \times 10^6$ roentgens. The film was removed from monomer and washed for several hours with benzene to remove unpolymerized and homopolymerized styrene. The film was dried to constant weight and a 26% weight increase was observed which corresponds to a 21% styrene content in the copolymer. The flexible copolymer film had a tensile strength of about 2,000 pounds per square inch.

A 0.2 gram piece of the copolymer film was sulfonated at room temperature for forty minutes by immersion in chlorosulfonic acid. It was then immersed in carbon tetrachloride and washed with water to remove excess acid. Finally it was heated in about 20% caustic soda for about fifteen minutes at 60°–70° C.

The ion exchange membrane so produced showed a wet tensile strength of about 1,150 pounds per square inch, and it was flexible even when dry. The $H^+$ form of the membrane swelled in distilled water to about 162% of the weight of the dry membrane. Titration with 0.10 normal caustic soda showed a dry capacity of 1.72 milliequivalents per gram and a wet capacity of 1.06 milliequivalents per gram. The permeaselectivity of this membrane was 0.94 in 0.10 normal sodium chloride and 0.80 in 0.60 normal sodium chloride.

The $Na^+$ form of the membrane showed a specific conductivity of $11 \times 10^{-3}$ reciprocal ohm per centimeter when equilibrated in distilled water. In 1.0 normal sodium chloride the specific conductivity increased to $13 \times 10^{-3}$ reciprocal ohm per centimeter. The conductivity measurements were made parallel to the membrane surface.

Example 2

A polyethylene film ten mils thick and three inches square was immersed in styrene monomer for about thirty minutes. Absorption or swelling reached an equilibrium maximum within this time and the whole system was next irradiated by exposure for six hours to a cobalt sixty source. The total radiation dose was about $1.8 \times 10^6$ roentgens. The film was removed from monomer and washed for several hours with toluene to remove unpolymerized and homopolymerized styrene. The film was dried to constant weight and a 47% weight increase was observed which corresponds to a 32% styrene content in the copolymer. The flexible copolymer film had a tensile strength of about 1,500 pounds per square inch.

A 0.5 gram piece of the copolymer film was sulfonated at room temperature for one hundred and forty minutes by immersion in chlorosulfonic acid. It was then immersed in carbon tetrachloride and washed with water to remove excess acid. Finally it was heated in about 20% caustic soda for about fifteen minutes at 60°–70° C.

The ion exchange membrane so produced showed a wet tensile strength of about 600 pounds per square inch, and it was flexible even when dry. The $H^+$ form of the membrane swelled in distilled water to about 190% of the weight of the dry membrane. Titration with 0.10 normal caustic soda showed a dry capacity of 1.08 milliequivalents per gram. The permeaselectivity of this membrane was 0.97 in 0.10 normal sodium chloride and 0.90 in 0.60 normal sodium chloride.

The $Na^+$ form of the membrane showed a specific conductivity of $14 \times 10^{-3}$ reciprocal ohm per centimeter when equilibrated in distilled water. In 1.0 normal sodium chloride the specific conductivity increased to $17 \times 10^{-3}$ reciprocal ohm per centimeter. The conductivity measurements were made parallel to the membrane surface.

*Example 3*

A synthetic rubber sheet (butadiene and acrylonitrile copolymer sheet) was immersed in styrene monomer containing inhibitors. The swollen gel was placed in a flat aluminum mold and placed in a cobalt sixty source for one hundred hours so that the total dosage received was about thirty million roentgens. The sheet when removed from the mold was a slightly elastic plastic. Sulfonation of this sheet yielded a cation exchange membrane.

*Example 4*

A polyethylene film, four mils in thickness and twenty inches square was immersed in vinyl pyridine (containing inhibitor and the system was irradiated by a cobalt sixty source for forty minutes. The film was removed from the monomer, washed with water to remove unpolymerized monomer and its homopolymer and dried. The film weight increased approximately 35%. Polyvinyl pyridine grafted polyethylene film is a weak anion membrane. It was converted to the pyridinium form by immersion in a 10% hydrochloric acid solution, followed by washing with water. The pyridium form is useful in neutral or acidic media.

*Example 5*

A polyethylene film four mils thick and two inches square was immersed in vinyl pyridine in a shallow tray. The system was subjected to irradiation by an X-ray beam from a copper target. For a total dosage of thirty million roentgens a polymerization period of thirty minutes was allowed. Next the graft copolymer film was removed, washed free of monomer and homopolymer with butyl alcohol and dried. A weight increase of 30% was obtained. Quaternization of the pyridine group was accomplished by heating in a 10% tertiary butyl bromide–90% nitromethane solution at 70° C. for eight hours. The film was then removed, washed first with a 10% sodium chloride solution, then with water and then dried. The quarternized form is suitable for use in alkaline media.

*Example 6*

A polyethylene film four mils in thickness was immersed in vinyl pyridine contained in a shallow trough. The film was then removed from the monomer and subjected to irradiation by an electron beam from a resonance transformer at an intensity of one million electron volts. The film was re-immersed intermittently in vinyl pyridine to absorb additional monomer. When a total dosage of twenty-three million roentgens had been applied, the film was washed with water and dried.

*Example 7*

The film made as in Example 1 was heated in a closed vessel in chloromethyl ether containing about one percent zinc chloride catalyst at 50° C. for three hours. The chloromethylated film was washed sequentially for several minutes with dioxane, water, dilute hydrochloric acid and water. The washed film was next immersed in a (2:2:1 by volume) mixture of dioxane, water and trimethylamine at a temperature about 50° C. Temperatures between 20° C. and 80° C. are satisfactory. Higher temperatures reduce immersion time which is several hours.

*Example 8*

The polyethylene-polyvinyl pyridine copolymer film described in Example 4 which is inherently a cation exchange material without additional treatment was converted to anion exchange material. The film was heated in a 10% t-butyl bromide–90% nitromethane solution at about 65° C. for about seven hours. Other pyridine quaternization methods may be used alternatively.

There have thus been described novel ion exchange materials and methods of forming. These materials are mostly modified branched copolymers in which the branches are sites for ion exchange groups and the trunk serves to give toughness and mechanical strength. The branches are attached to the trunk by ionizing radiation of the solid trunk material in contact with liquid monomeric branch material.

What is claimed is:

1. A method of making ion exchange membrane comprising contacting a first solid, organic, water insoluble carrier polymer polymerized from an ethylenically unsaturated monomer and a second different fluid organic ethylenically unsaturated monomer, causing the monomer to polymerize by a free radical mechanism and to penetrate into said carrier polymer, and providing ion exchange groups in the composite polymer product, said product being a film having ion exchange groups penetrating the entire thickness.

2. A method according to claim 1 in which the carrier polymer is polymerized from a monomer selected from at least one of the group consisting of ethylene, propylene, vinyl halides, vinylidene halides, acrylonitrile, butadiene, vinyl ethers, alkyl acrylates and alkyl methacrylates.

3. A method according to claim 1 wherein the second monomer is selected from the group consisting of styrene, alkyl styrenes, styrene sulfonic esters, nuclearly halogenated styrenes, haloalkyl styrenes, vinyl pyridine, vinyl piperidine, vinyl lutidine, vinyl carbazole, vinyl sulfones, vinyl naphthalene, vinyl aniline, methacrylic acid, allyl amine and N,N-dialkylamino ethyl methacrylates.

4. A method according to claim 1 in which the carrier polymer is selected from the group consisting of natural and synthetic rubbers.

5. A method of making ion exchange membrane comprising contacting a film of solid carbon to carbon main chain organic polymer and a fluid ethyleneically unsaturated monomer, causing the monomer to polymerize by a free radical mechanism and to penetrate into the film to form a composite polymer film and providing ion exchange groups in said film penetrating the entire thickness thereof.

6. A method according to claim 5 in which the film is polyalkylene and the monomer is styrene and sulfonic groups are provided in the product by sulfonation.

7. A method according to claim 5 in which the membrane is crosslinked.

8. A method according to claim 5 in which ion exchange groups are provided in the composite polymer by chloromethylation followed by amination.

9. A method of making ion exchange membrane which is water insoluble at room temperature which comprises in combination the steps of: providing a solid, organic, water insoluble polymer of a monomer selected from the group consisting of ethylene, propylene, vinyl halides, vinylidene halides, acrylonitrile, butadiene, alkyl acrylates, alkyl methacrylates and vinyl ethers, and an ethylenically unsaturated fluid monomer; swelling said polymer in said monomer; forming free radical sites within said polymer; grafting said monomer into said polymer at said free radical sites to form a copolymer; said substituting ion exchange groups upon said copolymer.

10. A method of making ion exchange membrane which is water insoluble at room temperature, comprising in combination the steps of: providing a solid, organic, water insoluble film forming polymer of a monomer selected from the group consisting of ethylene, vinyl halides, vinylidene halides, acrylonitrile, propylene, butadiene, alkyl acrylates, alkyl methacrylates and vinyl ethers; providing an ethylenically unsaturated liquid monomer selected from the group consisting of styrene, alkyl styrene, styrene sulfonic esters, vinyl pyridine, vinyl piperidine, vinyl lutidine, vinyl carbazole, vinyl sulfones, vinyl naphthalene, vinyl aniline, acrylic acid, methacrylic acid, allyl amine and N,N-dialkylaminoethyl methacrylates, treating the polymer to form free radical sites, swelling said solid polymer in said monomer, polymerizing said monomer to form hydrocarbon chains, removing monomer from said polymer and substituting upon said hydrocarbon chains, formed by the polymerization of monomer, ion exchange groups from the group consisting of carboxylic; carboxylate; sulfonic; sulfonate; primary, secondary and tertiary amino; and quaternary ammonium.

11. The method of making an ion exchange membrane which comprises in combination the steps of: providing a film of polymeric material of a monomer selected from the group consisting of ethylene, propylene, vinyl halides, vinylidene halides, acrylonitrile, butadiene, alkyl acrylates, alkyl methacrylates and vinyl ethers in solid phase and an ethyleneically unsaturated monomeric material in liquid phase; swelling said polymeric material with said monomeric material to form a polymer-monomer mixture; treating said polymer-monomer mixture to for free radicals; polyerizing said monomeric material to form a polymer mixture including a graft copolymer and providing ion exchange groups within said polymer mixture.

12. A process for producing selective membrane, by introducing in an organic polymeric material ion exchange groups comprising the steps of using as an organic polymeric material a product obtained by swelling a polyalkene base material in an aromatic vinyl monomer, treating the polymeric material to form free radical sites and subjecting the swollen product to polymerization.

13. A process for producing selective membrane by introducing ion exchange groups into an organic product formed from polyethylene and an aromatic vinyl monomer comprising the steps of: swelling polyethylene polymer in an aromatic vinyl monomer; treating the polymer to form free radical sites; and subjecting the swollen product to polymerization.

14. A process for producing selective membrane by introducing ion exchange groups into an organic product formed from polypropylene polymer and an aromatic vinyl monomer comprising the steps of: swelling polypropylene in an aromatic vinyl monomer; treating the polymer to form free radical sites; and subjecting the swollen product to polymerization.

References Cited by the Examiner
UNITED STATES PATENTS

| | | | |
|---|---|---|---|
| 2,340,111 | 1/1944 | D'Alelio | 260—2.2 |
| 2,591,573 | 4/1952 | McBurney | 260—2.1 |
| 2,827,426 | 3/1958 | Bodamer | 204—98 |
| 2,837,496 | 6/1958 | Vandenberg | 260—45.5 |
| 2,921,005 | 1/1960 | Bodamer | 204—72 |
| 2,965,697 | 12/1960 | Duddy | 260—2.2 |
| 3,115,418 | 12/1963 | Magat et al. | 204—154 |
| 3,133,889 | 5/1964 | Hazenberg | 260—2.1 |

FOREIGN PATENTS 728,508  1/1955  Great Britain.

OTHER REFERENCES

Ballantine: J. Polymer Science, vol. 19, pages 219–224, January 1956.

Brookhaven National Laboratory (BNL 375) page 26, April 1956; Quarterly Progress Report, Oct. 1–Dec. 31, 1955.

Carlin et al., J. Amer. Chem. Soc., vol. 68, pages 876–8 (1946).

Potts et al.: Chemical Grafting of Vinyl Monomers to Polyethylene, presented to Division of Polymer Chemistry, 132nd Meeting of A.C.S., Sept. 13, 1957, Bakelite Co., 15 pages, pp. 3–7 relied upon.

WILLIAM H. SHORT, *Primary Examiner.*

J. C. MARTIN, *Assistant Examiner.*